(12) United States Patent
Fujiwara

(10) Patent No.: US 11,588,799 B2
(45) Date of Patent: Feb. 21, 2023

(54) MOVING OBJECT CONTROL SYSTEM, MOVING OBJECT CONTROL DEVICE, AND MOVING OBJECT CONTROL METHOD

(71) Applicant: TOYOTA JIDOSHA KABUSHIKI KAISHA, Toyota (JP)

(72) Inventor: Yasuhisa Fujiwara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 726 days.

(21) Appl. No.: 16/524,239

(22) Filed: Jul. 29, 2019

(65) Prior Publication Data

US 2020/0127986 A1    Apr. 23, 2020

(30) Foreign Application Priority Data

Oct. 22, 2018    (JP) .............................. JP2018-198428

(51) Int. Cl.
*H04L 9/40* (2022.01)
*G07C 9/00* (2020.01)
*B60R 25/20* (2013.01)

(52) U.S. Cl.
CPC ........ *H04L 63/061* (2013.01); *B60R 25/2018* (2013.01); *G07C 9/00309* (2013.01); *G07C 9/00571* (2013.01); *H04L 63/0869* (2013.01)

(58) Field of Classification Search
None
See application file for complete search history.

(56) References Cited

U.S. PATENT DOCUMENTS

| 9,373,201 | B2 * | 6/2016 | Jefferies | B60R 25/045 |
| 2002/0184373 | A1 * | 12/2002 | Maes | H04L 29/06027 |
| | | | | 704/E15.047 |
| 2004/0198389 | A1 * | 10/2004 | Alcock | H04W 4/029 |
| | | | | 455/457 |
| 2017/0372546 | A1 * | 12/2017 | Haruna | G07C 9/00309 |
| 2017/0372547 | A1 * | 12/2017 | Fujiwara | G07B 15/02 |
| 2017/0374047 | A1 * | 12/2017 | Fujiwara | B60R 25/2018 |
| 2018/0222283 | A1 * | 8/2018 | Tamane | B60H 1/00971 |
| 2018/0245559 | A1 * | 8/2018 | Kang | G07C 9/00944 |
| 2020/0127986 | A1 * | 4/2020 | Fujiwara | H04W 12/72 |
| 2020/0384948 | A1 | 12/2020 | Toyooka et al. | |

FOREIGN PATENT DOCUMENTS

| CN | 104163158 A | 11/2014 |
| CN | 106301781 A | 1/2017 |
| CN | 107689098 A | 2/2018 |

(Continued)

*Primary Examiner* — Carlos Garcia
(74) *Attorney, Agent, or Firm* — Oblon, McClelland, Maier & Neustadt, L.L.P.

(57) ABSTRACT

A moving object control system includes a server, a portable terminal configured to transmit authentication information issued by the server, and a controller provided in a moving object and configured to authenticate the portable terminal according to the authentication information transmitted from the portable terminal, and when the portable terminal is authenticated, control the moving object in response to an operation signal from the portable terminal. The controller is configured to perform information communication with the server and control the moving object according to control information received from the server.

9 Claims, 2 Drawing Sheets

(56) References Cited

FOREIGN PATENT DOCUMENTS

| | | | |
|---|---:|---|---|
| JP | 2017-85200 | A | 5/2017 |
| JP | 2018-3330 | A | 1/2018 |
| JP | 2018-3331 | A | 1/2018 |
| JP | 2018-5353 | A | 1/2018 |
| JP | 6320647 | B1 | 5/2018 |

\* cited by examiner

MOVING OBJECT CONTROL SYSTEM, MOVING OBJECT CONTROL DEVICE, AND MOVING OBJECT CONTROL METHOD

INCORPORATION BY REFERENCE

The disclosure of Japanese Patent Application No. 2018-198428 filed on Oct. 22, 2018 including the specification, drawings and abstract is incorporated herein by reference in its entirety.

BACKGROUND

1. Technical Field

The present disclosure relates to a moving object control system, a moving object control device, and a moving object control method.

2. Description of Related Art

Japanese Unexamined Patent Application Publication No. 2018-003330 (JP 2018-003330 A), Japanese Unexamined Patent Application Publication No. 2018-003331 (JP 2018-003331 A), and Japanese Unexamined Patent Application Publication No. 2018-005353 (JP 2018-005353 A) disclose a locking and unlocking system including a control device provided on a vehicle side to be locked or unlocked, a portable terminal communicable with the control device, and a server communicable with the portable terminal. In the locking and unlocking system, the server transmits authentication information to the portable terminal in response to reception of a signal for requesting locking or unlocking from the portable terminal to be operated by a user. Then, the user transmits the authentication information received by the portable terminal to the control device and the control device locks or unlocks the vehicle according to the received authentication information.

SUMMARY

In the locking and unlocking system described in JP 2018-003330 A, JP 2018-003331 A, and JP 2018-005353 A, in a case where a communication line between the portable terminal and the control device cannot be established, the authentication information cannot be transmitted to the control device, and thus, the vehicle cannot be locked or unlocked. Here, as a case where the communication line between the portable terminal and the control device cannot be established, a case where at least one of the portable terminal and the vehicle is stolen, a case where communication failure occurs between the portable terminal and the control device, a case where a portable terminal is powered down, and the like can be exemplified. For this reason, even in a case where the communication line cannot be established between the portable terminal and the control device, a structure capable of controlling the vehicle provided with the control device is expected to be provided.

The disclosure provides a moving object control system, a moving object control device, and a moving object control method capable of controlling a moving object even when a communication line with a portable terminal cannot be established.

A first aspect of the disclosure relates to a moving object control system. The moving object control system includes a server, a portable terminal, and a controller. The portable terminal is configured to transmit authentication information issued by the server. The controller is provided in the moving object and is configured to authenticate the portable terminal according to the authentication information transmitted from the portable terminal, and when the portable terminal is authenticated, control the moving object in response to an operation signal from the portable terminal. The controller is configured to perform information communication with the server and control the moving object according to control information received from the server.

In the moving object control system according to the first aspect, the control information may include the authentication information.

In the moving object control system according to the first aspect, the server may be configured to transmit the control information to the controller in response to reception of a request signal transmitted from outside.

In the moving object control system according to the first aspect, the server may be configured to transmit the control information to the controller in response to detection that regular communication between the portable terminal and the controller is interrupted.

In the moving object control system according to the first aspect, the server may be configured to transmit the control information to the controller in response to detection that a position of the portable terminal and a position of the controller are separated at a predetermined distance or more.

A second aspect of the disclosure relates to a moving object control device provided in a moving object. The moving object control device includes a controller. The controller is configured to receive authentication information issued by a server from a portable terminal, authenticate the portable terminal according to the received authentication information, and when the portable terminal is authenticated, control the moving object in response to an operation signal from the portable terminal. The controller is configured to perform information communication with the server and control the moving object according to control information received from the server.

In the moving object control device according to the second aspect, the controller may be configured to acquire positional information of the moving object.

The moving object control device according to the second aspect may further include a connection unit connected to the moving object in a wired manner.

A third aspect of the disclosure relates to a moving object control method. The moving object control method includes, by a controller provided in the moving object, receiving authentication information issued by a server from a portable terminal, authenticating the portable terminal according to the received authentication information, when the portable terminal is authenticated, and controlling the moving object in response to an operation signal from the portable terminal. The controller controls the moving object according to control information received from the server.

With the moving object control system, the moving object control device, and the moving object control method according to the aspects of the disclosure, it is possible to control the moving object even when a communication line with the portable terminal cannot be established.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
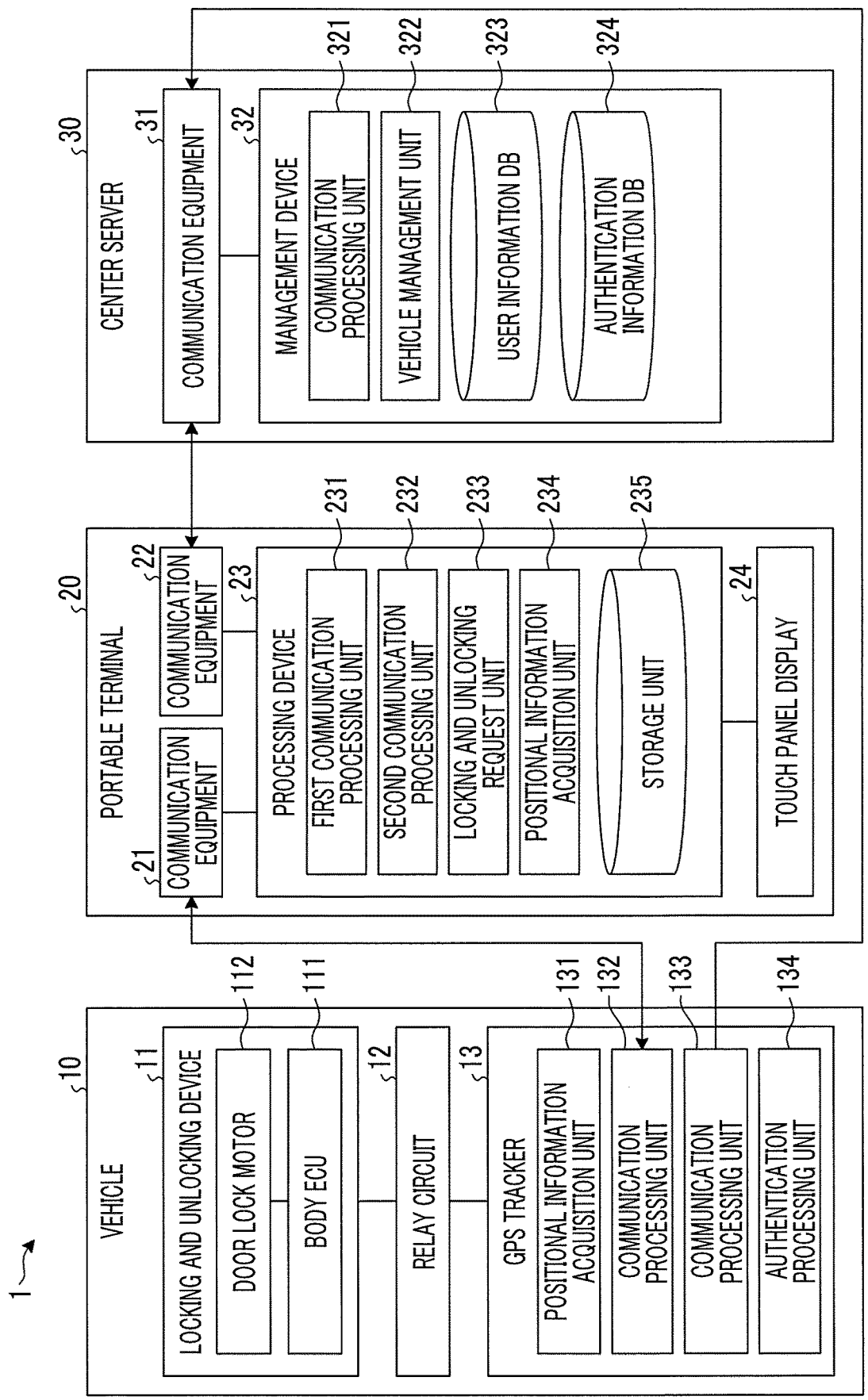
FIG. 1 is a block diagram showing the configuration of a moving object control system of an embodiment.

Hereinafter, a moving object control system of an embodiment will be described referring to the drawings.

Configuration

First, the configuration of the moving object control system of the embodiment will be described referring to FIG. 1.

FIG. 1 is a block diagram showing the configuration of the moving object control system of the embodiment. As shown in FIG. 1, a moving object control system 1 of the embodiment includes a vehicle 10, a portable terminal 20, and a center server 30.

The vehicle 10 is a moving object that is subjected to a control operation in the moving object control system 1, such as a locking and unlocking operation of a door, a start and stop operation of an engine, or a physical key management. In the embodiment, the vehicle 10 includes a locking and unlocking device 11, a relay circuit 12, and a global positioning system (GPS) tracker 13.

The locking and unlocking device 11 executes locking or unlocking of the door of the vehicle 10 in response to a locking signal or an unlocking signal to be transmitted from the GPS tracker 13 through the relay circuit 12. The locking and unlocking device 11 operates with electric power to be supplied from an accessory battery (not shown) mounted in the vehicle 10.

The locking and unlocking device 11 includes a body electronic control unit (ECU) 111 and a door lock motor 112.

The body ECU 111 is an electronic control unit that executes operation control of the door lock motor 112 connected to be communicable through a one-to-one communication line. The body ECU 111 outputs a control signal for making the door lock motor 112 execute a locking operation in response to the locking signal from the GPS tracker 13. Furthermore, the body ECU 111 outputs a control signal for making the door lock motor 112 execute an unlocking operation in response to the unlocking signal from the GPS tracker 13.

The door lock motor 112 is a known electric actuator that locks or unlocks the door (including a trunk lid, a back door, or the like) of the vehicle 10 in response to the control signal from the body ECU 111.

The relay circuit 12 is a circuit that connects the locking and unlocking device 11 and the GPS tracker 13 in a wired manner, and outputs various signals to be transmitted from the GPS tracker 13 to the locking and unlocking device 11. The GPS tracker 13 can be directly connected to the locking and unlocking device 11 through the relay circuit 12, whereby it is possible to use the moving object control system 1 by connecting a commercially available inexpensive GPS tracker to the locking and unlocking device 11 even in the vehicle 10 not provided with the GPS tracker 13.

The GPS tracker 13 is disposed inside the vehicle 10 (inside a vehicle cabin), and outputs the locking signal and the unlocking signal to the locking and unlocking device 11 through the relay circuit 12 in response to a locking request signal or an unlocking request signal to be transmitted from the portable terminal 20. An aspect in which the GPS tracker 13 is operated by an internal button battery or the like may be made or an aspect in which the GPS tracker 13 is operated with electric power to be supplied from the accessory battery mounted in the vehicle 10 may be made.

The GPS tracker 13 includes a positional information acquisition unit 131, a communication processing unit 132, a communication processing unit 133, and an authentication processing unit 134. The functions of the positional information acquisition unit 131, the communication processing unit 132, the communication processing unit 133, and the authentication processing unit 134 may be implemented by, for example, a controller.

The positional information acquisition unit 131 receives GPS signals to be distributed from three or more GPS satellites orbiting around the earth and measures positional information of the vehicle 10 based on the received GPS signals.

The communication processing unit 132 is any device that performs communication with communication equipment 21 of the portable terminal 20 at a comparatively short distance (such a distance that communication can be performed between the inside of the vehicle cabin and the outside of the vehicle cabin) according to a predetermined communication standard. As such a device, a BLE (Bluetooth (Registered Trademark) Low Energy) communication module that performs communication based on a BLE communication standard or a near field communication (NFC) communication module that performs communication based on an NFC standard can be exemplified. Hereinafter, description will be provided assuming that the communication standard of the communication processing unit 132 is the BLE communication standard.

The communication processing unit 133 is any device that performs communication with communication equipment 31 of the center server 30 at a comparatively short distance according to a predetermined communication standard. As such a device, a long term evolution (LTE) communication module that performs communication based on an LTE communication standard can be exemplified. Hereinafter, description will be provided assuming that the communication standard of the communication processing unit 133 is the LTE communication standard.

The authentication processing unit 134 is constituted of a subscriber identity module (SIM). In a case where the communication processing unit 132 receives the locking request signal or the unlocking request signal from the portable terminal 20, the authentication processing unit 134 performs authentication based on BLE authentication information included in the locking request signal or the unlocking request signal. The BLE authentication information is set uniquely to the GPS tracker 13 in advance, that is, is associated with the GPS tracker 13. In a case where authentication corresponding to the unlocking request signal received by the communication processing unit 132 is successful, the authentication processing unit 134 transmits the unlocking signal to the locking and unlocking device 11 through the relay circuit 12. In a case where authentication corresponding to the locking request signal received by the communication processing unit 132 is successful, the authentication processing unit 134 transmits the locking signal to the locking and unlocking device 11 through the relay circuit 12, and transmits locking notification to the portable terminal 20 through the communication processing unit 132. In the embodiment, although one-stage authentication processing is executed, multistage authentication processing may be executed using a SIM technique.

In a case where the communication processing unit 133 receives a connection request signal from the center server 30, the authentication processing unit 134 performs authentication using authentication information included in the connection request signal. The authentication information is set uniquely to the GPS tracker 13 in advance, that is, is associated with the GPS tracker 13. In a case where authentication corresponding to the connection request signal received by the communication processing unit 133 is successful, the authentication processing unit 134 transmits the locking signal or the unlocking signal to the locking and unlocking device 11 through the relay circuit 12 in response to the locking request signal or the unlocking request signal included in the connection request signal.

The portable terminal 20 is constituted of a portable information communication terminal, such as a smartphone or a tablet terminal. The portable terminal 20 can perform bidirectional communication with the center server 30 through a predetermined communication network (for example, a mobile phone network with multiple base stations as terminals, an Internet network, or the like). The portable terminal 20 includes communication equipment 21, communication equipment 22, a processing device 23, and a touch panel display (hereinafter, simply referred to as a display) 24.

The communication equipment 21 is any device that performs communication with the GPS tracker 13 based on the same communication standard as the communication processing unit 132.

The communication equipment 22 is any device that performs communication with the center server 30 through a predetermined communication network.

The processing device 23 includes a processor, such as a central processing unit (CPU), an auxiliary storage device, and the like, and includes, as functional units to be implemented by the processor executing a computer program, a first communication processing unit 231, a second communication processing unit 232, a locking and unlocking request unit 233, and a positional information acquisition unit 234. The processing device 23 includes a storage unit 235 to be implemented as a storage area inside the auxiliary storage device.

The first communication processing unit 231 communicates with the GPS tracker 13 using the communication equipment 21 and performs transmission and reception of various signals. For example, the first communication processing unit 231 transmits the locking request signal or the unlocking request signal to the GPS tracker 13 in response to a request from the locking and unlocking request unit 233.

The second communication processing unit 232 communicates with a base station using the communication equipment 22 in a wireless manner, and transmits and receives data various signals, such as data signals or control signals. In the embodiment, the second communication processing unit 232 performs transmission and reception of various signals with the center server 30 through a mobile phone network with base stations as terminals, an Internet network, or the like. For example, the second communication processing unit 232 transmits a signal for requesting the BLE authentication information to the center server 30 in response to a request from the locking and unlocking request unit 233 and receives a signal including the BLE authentication information to be transmitted from the center server 30. The BLE authentication information received by the second communication processing unit 232 is stored in the storage unit 235.

The locking and unlocking request unit 233 transmits the locking request signal including the BLE authentication information or the unlocking request signal including the BLE authentication information to the GPS tracker 13 through the first communication processing unit 231 according to a predetermined operation on a graphical user interface (GUI) to be displayed as an operation screen on the display 24. For example, a locking button for requesting locking of the vehicle 10 and an unlocking button for requesting unlocking of the vehicle 10 are drawn on the GUI of the display 24, the locking request signal is transmitted with a touch operation of the locking button, and the unlocking request signal is transmitted with a touch operation of the unlocking button.

An operation to transmit the locking request signal or the unlocking request signal to the GPS tracker 13 may be an operation on an operation unit of hardware provided in the portable terminal 20, instead of an operation on the display 24. In a case where the BLE authentication information is not stored in the storage unit 235 (for example, a case where the BLE authentication information is not received from the center server 30, or the like), the BLE authentication information is not included in the locking request signal and the unlocking request signal. For this reason, even in a case where the locking request signal or the unlocking request signal is transmitted to the GPS tracker 13, the door of the vehicle 10 cannot be locked or unlocked. In a case where the BLE authentication information is not stored in the storage unit 235, the locking request signal and the unlocking request signal may be made to be not transmitted.

The locking and unlocking request unit 233 transmits an authentication information request signal for requesting the BLE authentication information to the center server 30 through the second communication processing unit 232 according to a predetermined operation on the GUI. For example, an input column of identification information of a user, a password, or the like and a transmission button are drawn on the GUI of the display 24, and the transmission button is touched after needed matters are input, whereby the authentication information request signal is transmitted to the center server 30.

The positional information acquisition unit 234 receives GPS signals to be distributed from three or more GPS satellites orbiting around the earth and measures positional information of the portable terminal 20 based on the received GPS signals.

The center server 30 manages the control operation on the vehicle 10, such as the locking and unlocking operation of the door or the start and stop operation of the engine. The center server 30 includes communication equipment 31 and a management device 32.

The communication equipment 31 is any device that performs communication with the vehicle 10 or the portable terminal 20 through a predetermined communication network.

The management device 32 is primarily constituted of one or a plurality of processors, and includes, as functional units to be implemented by the processor executing a computer program, a communication processing unit 321 and a vehicle management unit 322. The management device 32 includes a user information database (user information DB) 323 and an authentication information database (authentication information DB) 324 that are stored in an internal auxiliary storage device.

The communication processing unit 321 performs transmission and reception of various signals with the vehicle 10 or the portable terminal 20 using the communication equipment 31. For example, the communication processing unit 321 receives the signal for requesting the BLE authentication information from the portable terminal 20 and transmits the signal including the BLE authentication information to the portable terminal 20 according to a request from the vehicle management unit 322 corresponding to the received signal.

The vehicle management unit 322 is constituted of a SIM. The vehicle management unit 322 transmits the signal including the BLE authentication information to the portable terminal 20 through the communication processing unit 321 in a case where the communication processing unit 321 receives the signal for requesting the BLE authentication information from the portable terminal 20. For example, the vehicle management unit 322 collates whether or not the identification information of the user and the password included in the signal for requesting the BLE authentication information coincide with the identification information of the user and the password registered in the user information DB 323 in advance. In a case where both coincide with each other, the vehicle management unit 322 determines that the user is an authorized user, and reads the BLE authentication information corresponding to the GPS tracker 13 mounted in the vehicle 10 from the authentication information DB 324. Then, the vehicle management unit 322 transmits the signal including the BLE authentication information to the portable terminal 20 through the communication processing unit 321. In the embodiment, although one-stage authentication processing is executed, multistage authentication processing may be executed using the SIM technique.

In the user information DB 323, the identification information of each user who uses the vehicle 10, the corresponding password, and the like registered in advance are stored.

In the authentication information DB 324, the BLE authentication information associated with identification information unique to the GPS tracker 13 is stored.

On the other hand, in the moving object control system 1 having such a configuration, in a case where a communication line cannot be established between the communication processing unit 132 of the vehicle 10 and the communication equipment 21 of the portable terminal 20, since the BLE authentication information cannot be transmitted from the portable terminal 20 to the vehicle 10, the vehicle 10 cannot be locked or unlocked. Here, as a case where the communication line cannot be established between the communication processing unit 132 of the vehicle 10 and the communication equipment 21 of the portable terminal 20, a case where at least one of the vehicle 10 and the portable terminal 20 is stolen, a case where communication failure occurs between the communication processing unit 132 and the communication equipment 21, a case where the portable terminal 20 is powered down, and the like can be exemplified.

Accordingly, in a case where the communication line cannot be established between the communication processing unit 132 of the vehicle 10 and the communication equipment 21 of the portable terminal 20, the moving object control system 1 controls the vehicle 10 by executing moving object control processing described below. Hereinafter, an operation of the moving object control system 1 in executing the moving object control processing will be described referring to FIG. 2.

Moving Object Control Processing

Figure 2:
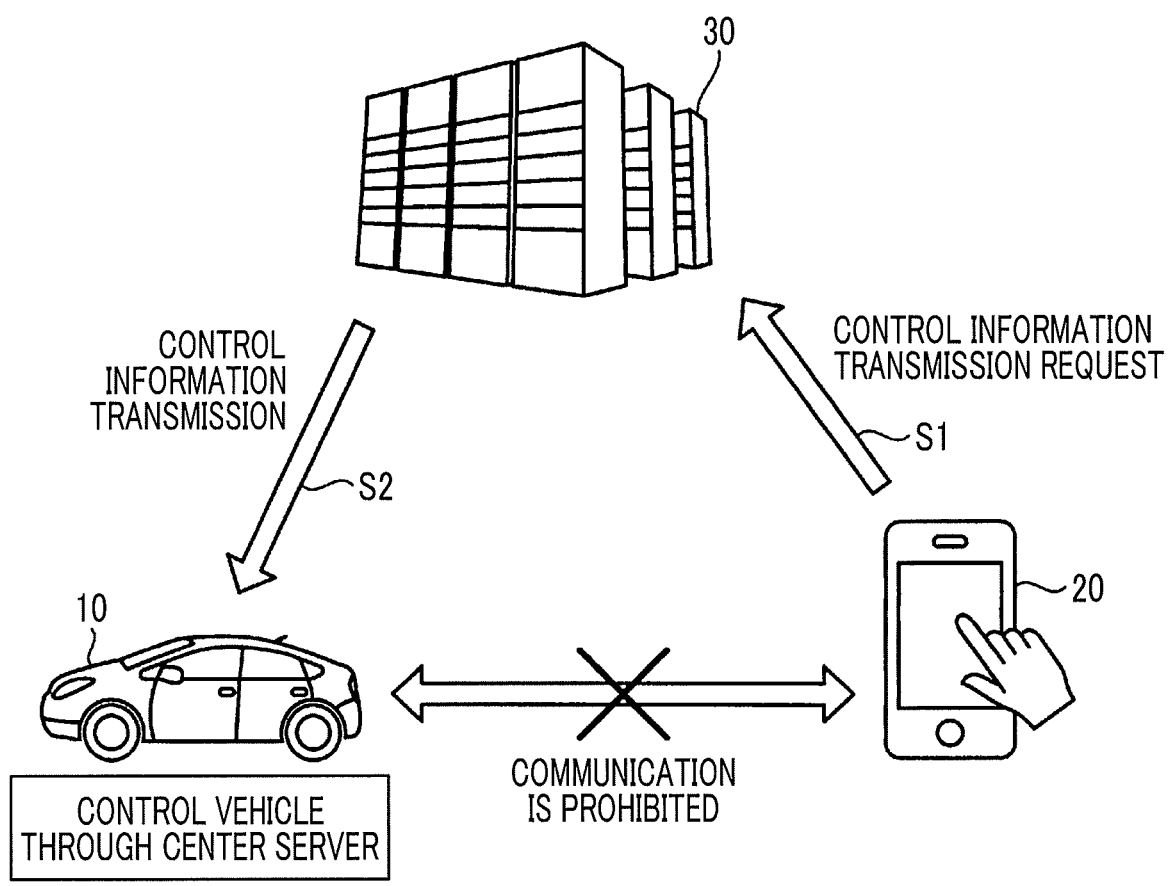
FIG. 2 is a schematic view illustrating an operation of the moving object control system shown in FIG. 1 in a case where a communication line cannot be established between a vehicle and a portable terminal.

FIG. 2 is a schematic view illustrating an operation of the moving object control system 1 in a case where a communication line cannot be established between the vehicle 10 and the portable terminal 20. Hereinafter, a case where a communication line cannot be established between the vehicle 10 and the portable terminal 20 since communication failure occurs between the vehicle 10 and the portable terminal 20, and the vehicle 10 is requested to be locked or unlocked will be described as an example.

As shown in FIG. 2, in a case where the communication line cannot be established between the vehicle 10 and the portable terminal 20 since communication failure occurs between the vehicle 10 and the portable terminal 20, first, the user operates the portable terminal 20 to transmit the locking request signal including the identification information of the user and the password or the unlocking request signal including the identification information of the user and the password to the center server 30. The locking and unlocking request unit 233 of the portable terminal 20 transmits the locking request signal or the unlocking request signal (control information transmission request) to the center server 30 through the second communication processing unit 232 and the communication equipment 22 according to a user's operation (Step S1).

In this case, in order to distinguish the above-described processing from processing during a normal time in which the communication line is established between the vehicle 10 and the portable terminal 20, it is assumed that an operation screen of the user is different from an operation screen during the normal time. For example, an emergency locking button for requesting locking of the vehicle 10 in emergency and an emergency unlocking button for requesting unlocking of the vehicle 10 in emergency are drawn on the GUI of the display 24, the locking request signal is transmitted with a touch operation of the emergency locking button, and the unlocking request signal is transmitted with a touch operation of the emergency unlocking button.

Next, the vehicle management unit 322 of the center server 30 collates whether or not the identification information of the user and the password included in the locking request signal or the unlocking request signal coincide with the identification information of the user and the password registered in the user information DB 323 in advance with the reception of the locking request signal or the unlocking request signal. In a case where both coincide with each other, the vehicle management unit 322 determines that the user is an authorized user, and reads the authentication information corresponding to the GPS tracker 13 mounted in the vehicle 10 associated with the user from the authentication information DB 324. Then, the vehicle management unit 322 transmits the connection request signal including the authentication information and the locking request signal or the unlocking request signal to the vehicle 10 through the communication processing unit 321 (Step S2). In the embodiment, although one-stage authentication processing is executed, multistage authentication processing may be executed using the SIM technique.

Thereafter, in a case where the communication processing unit 133 receives the connection request signal (control information) from the center server 30, the authentication processing unit 134 of the vehicle 10 performs authentication using the authentication information included in the connection request signal. In a case where authentication corresponding to the connection request signal received by the communication processing unit 133 is successful, the authentication processing unit 134 transmits the locking signal or the unlocking signal to the locking and unlocking device 11 through the relay circuit 12 in response to the locking request signal or the unlocking request signal included in the connection request signal. In the embodiment, although one-stage authentication processing is executed, multistage authentication processing may be executed using the SIM technique.

In the embodiment, although the portable terminal 20 transmits the locking request signal or the unlocking request signal according to a user's operation, the portable terminal 20 may automatically transmit the locking request signal or the unlocking request signal to the center server 30 in response to detection that communication failure occurs between the vehicle 10 and the portable terminal 20.

In the embodiment, although the vehicle 10 is locked or unlocked, in a case where a request signal for instructing to start or stop the engine is included in the connection request signal, the authentication processing unit 134 starts or stops the engine in response to the request signal. Furthermore, in a case where a request signal for instructing to transmit the positional information of the vehicle 10 is included in the connection request signal, the authentication processing unit 134 acquires the positional information of the vehicle 10 from the positional information acquisition unit 131 and transmits the acquired positional information to the center server 30 through the communication processing unit 133.

In the embodiment, although a case where the communication line cannot be established between the vehicle 10 and the portable terminal 20 due to communication failure has been described, in a case where the communication line cannot be established between the vehicle 10 and the portable terminal 20 since one of the vehicle 10 and the portable terminal 20 is stolen, control may be executed such that the operation of the engine of the vehicle 10 is stopped at the timing at which the vehicle 10 is stopped through the center server 30. As a case where determination is made that one of the vehicle 10 and the portable terminal 20 is stolen, a case where notification is given from the user through a telephone or the GPS tracker 13, a case where regular communication between the vehicle 10 and the portable terminal 20 is interrupted, a case where the positional information of the vehicle 10 is separated from the positional information of the portable terminal 20 at a set distance or more, and a case where the behavior of the vehicle is different from a normal behavior history (route history, driving history, or the like) can be exemplified. In a case where the portable terminal 20 is stolen, the user may communicate with the center server 30 through the GPS tracker 13, and the center server 30 may control the operation of the portable terminal 20.

As will be apparent from the above description, in the moving object control system 1 of the embodiment, since the GPS tracker 13 performs information communication with the center server 30, and the vehicle 10 is controlled in response to a signal received from the center server 30, it is possible to control the vehicle 10 even in a case where a communication line with the portable terminal 20 cannot be established.

Although the embodiment of the disclosure has been described above, further effects or modification examples can be easily derived by those skilled in the art. Broader aspects of the disclosure are not limited to the specific details and the representative embodiment shown and described above. Accordingly, various alterations may be made without departing from the spirit or scope of the general inventive concept as defined by the appended claims and equivalents thereof.

What is claimed is:

1. A moving object control system comprising:
   a server;
   a portable terminal configured to transmit authentication information issued by the server; and
   a controller provided in a moving object and configured to authenticate the portable terminal according to the authentication information transmitted from the portable terminal, and when the portable terminal is authenticated, control the moving object in response to an operation signal from the portable terminal,
   wherein the controller is configured to perform information communication with the server and control the moving object according to control information received from the server, and
   wherein when a communication line cannot be established between the portable terminal and the controller, the server is configured to send control information to the controller in response to receiving a request signal sent from the portable terminal, and the controller is configured to control the moving object according to the control information sent by the server.

2. The moving object control system according to claim 1, wherein the control information includes the authentication information.

3. The moving object control system according to claim 1, wherein the server is configured to transmit the control information to the controller in response to reception of a request signal transmitted from outside.

4. The moving object control system according to claim 1, wherein the server is configured to transmit the control information to the controller in response to detection that regular communication between the portable terminal and the controller is interrupted.

5. The moving object control system according to claim 1, wherein the server is configured to transmit the control information to the controller in response to detection that a position of the portable terminal and a position of the controller are separated at a predetermined distance or more.

6. A moving object control device provided in a moving object, the moving object control device comprising a controller configured to receive authentication information issued by a server from a portable terminal, authenticate the portable terminal according to the received authentication information, and when the portable terminal is authenticated control the moving object in response to an operation signal from the portable terminal,
   wherein the controller is configured to perform information communication with the server and control the moving object according to control information received from the server, and
   wherein when a communication line cannot be established between the portable terminal and the controller, the server is configured to send control information to the controller in response to receiving a request signal sent from the portable terminal, and the controller is configured to control the moving object according to the control information sent by the server.

7. The moving object control device according to claim 6, wherein the controller is configured to acquire positional information of the moving object.

8. The moving object control device according to claim 6, further comprising a connection unit connected to the moving object in a wired manner.

9. A moving object control method comprising:
   by a controller provided in a moving object,
   receiving authentication information issued by a server from a portable terminal;
   authenticating the portable terminal according to the received authentication information; and when the portable terminal is authenticated, controlling the moving object in response to an operation signal from the portable terminal, wherein the controller controls the moving object according to control information received from the server, and wherein when a communication line cannot be established between the portable terminal and the controller, the server is configured to send control information to the controller in response to receiving a request signal sent from the portable terminal, and the method further comprises, controlling, via the controller, the moving object according to the control information sent by the server.

* * * * *